(12) United States Patent
Weksler et al.

(10) Patent No.: US 9,933,994 B2
(45) Date of Patent: Apr. 3, 2018

(54) RECEIVING AT A DEVICE AUDIBLE INPUT THAT IS SPELLED

(71) Applicant: Lenovo (Singapore) Pte. Ltd., New Tech Park (SG)

(72) Inventors: Arnold S. Weksler, Raleigh, NC (US); John Carl Mese, Cary, NC (US); Russell Speight VanBlon, Raleigh, NC (US); Nathan J. Peterson, Durham, NC (US)

(73) Assignee: Lenovo (Singapore) Pte. Ltd., Singapore (SG)

(*) Notice: Subject to any disclaimer, the term of this patent is extended or adjusted under 35 U.S.C. 154(b) by 36 days.

(21) Appl. No.: 14/313,336

(22) Filed: Jun. 24, 2014

(65) Prior Publication Data
US 2015/0370530 A1    Dec. 24, 2015

(51) Int. Cl.
G06F 3/16    (2006.01)
G06F 3/041   (2006.01)
G06F 3/01    (2006.01)
G10L 15/187  (2013.01)
G10L 15/22   (2006.01)

(52) U.S. Cl.
CPC ............. G06F 3/167 (2013.01); G10L 15/22 (2013.01); *G10L 15/187* (2013.01); *G10L 2015/223* (2013.01)

(58) Field of Classification Search
None
See application file for complete search history.

(56) References Cited

U.S. PATENT DOCUMENTS

| | | | | |
|---|---|---|---|---|
| 5,991,720 A * | 11/1999 | Galler | ..................... | G10L 15/08 704/251 |
| 9,317,189 B1 * | 4/2016 | Chen | ..................... | G06F 3/0484 |
| 2003/0233235 A1 * | 12/2003 | Park | ..................... | G06F 17/278 704/257 |
| 2008/0319751 A1 * | 12/2008 | Kennewick | ............. | G10L 15/22 704/257 |
| 2009/0182562 A1 * | 7/2009 | Caire | ................. | G01O 21/3608 704/275 |
| 2009/0326953 A1 * | 12/2009 | Peralta Gimenez | .... | G10L 15/26 704/270.1 |
| 2010/0105435 A1 * | 4/2010 | Ueda | ................... | H04M 1/0245 455/563 |
| 2011/0166862 A1 * | 7/2011 | Eshed | ..................... | G09B 7/02 704/270 |
| 2011/0172994 A1 * | 7/2011 | Lindahl | ................... | G06F 3/167 704/211 |
| 2012/0050685 A1 * | 3/2012 | Bartlett | ................ | A61B 3/0033 351/223 |
| 2013/0013305 A1 * | 1/2013 | Thompson | ........ | G06F 17/30734 704/235 |
| 2013/0035941 A1 * | 2/2013 | Kim | ........................ | G06F 3/017 704/275 |
| 2015/0058006 A1 * | 2/2015 | Proux | ..................... | G10L 15/26 704/235 |

* cited by examiner

*Primary Examiner* — Richa Mishra
(74) *Attorney, Agent, or Firm* — John L. Rogitz; John M. Rogitz

(57) ABSTRACT

In one aspect, a device includes a processor, a display accessible to the processor, and a memory accessible to the processor. The memory bears instructions executable by the processor to receive first input pertaining to second input to the device that will be spelled, receive the second input, and execute a function based on the second input. The second input is audible input.

20 Claims, 5 Drawing Sheets

| Word | Meaning |
|---|---|
| island | Land surrounded by water |
| isle | An island or peninsula |
| islet | A small island |
| Isleview | Location by Niagra River |

RECEIVING AT A DEVICE AUDIBLE INPUT THAT IS SPELLED

FIELD

The present application relates generally to receiving audible input at a device that is spelled.

BACKGROUND

Voice input to a device that contains words may be misunderstood and/or not identifiable by the device. Furthermore, it is often annoying and/or burdensome to repeat the voice input in the hope of the device understanding and/or identifying it upon repetition, and even then the device may misunderstand and/or not be able to identify the repeated voice input.

SUMMARY

Accordingly, in one aspect a device includes a processor, a display accessible to the processor, and a memory accessible to the processor. The memory bears instructions executable by the processor to receive first input pertaining to second input to the device that will be spelled, receive the second input, and execute a function based on the second input. The second input is audible input.

In another aspect, a method includes providing a prompt at a device for audible input to be spelled, and receiving audible input comprising input that is spelled.

In still another aspect, an apparatus includes a first processor, a network adapter, and storage bearing instructions executable by a second processor for receiving audible input comprising the spelling of at least one word and identifying the at least one word that is spelled. The first processor transfers the instructions over a network via the network adapter.

The details of present principles, both as to their structure and operation, can best be understood in reference to the accompanying drawings, in which like reference numerals refer to like parts, and in which:

DETAILED DESCRIPTION

Figure 1:
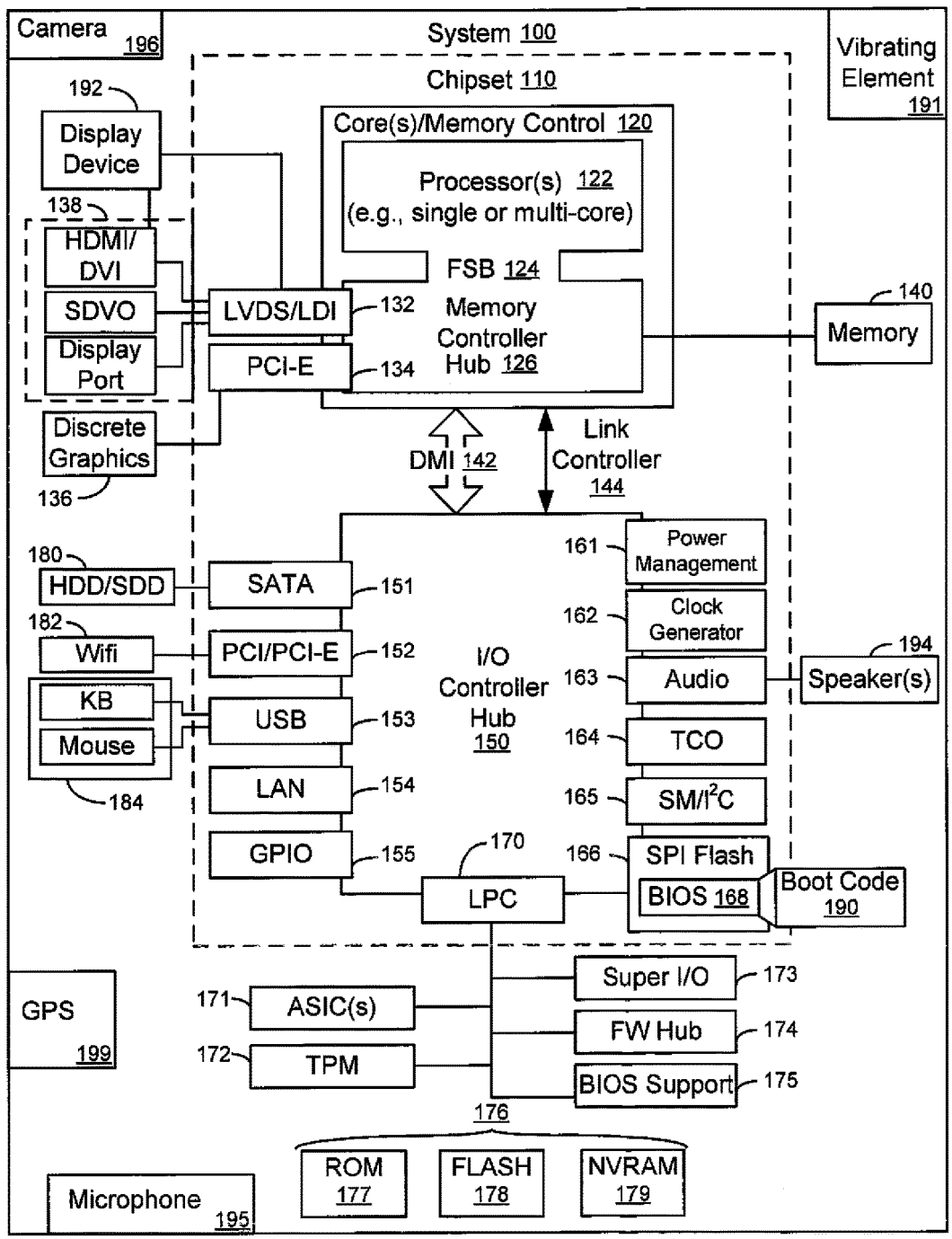
FIG. 1 is a block diagram of an example system in accordance with present principles.

This disclosure relates generally to device-based information. With respect to any computer systems discussed herein, a system may include server and client components, connected over a network such that data may be exchanged between the client and server components. The client components may include one or more computing devices including televisions (e.g. smart TVs, Internet-enabled TVs), computers such as desktops, laptops and tablet computers, so-called convertible devices (e.g. having a tablet configuration and laptop configuration), and other mobile devices including smart phones. These client devices may employ, as non-limiting examples, operating systems from Apple, Google, or Microsoft. A Unix or similar such as Linux operating system may be used. These operating systems can execute one or more browsers such as a browser made by Microsoft or Google or Mozilla or other browser program that can access web applications hosted by the Internet servers over a network such as the Internet, a local intranet, or a virtual private network.

As used herein, instructions refer to computer-implemented steps for processing information in the system. Instructions can be implemented in software, firmware or hardware; hence, illustrative components, blocks, modules, circuits, and steps are set forth in terms of their functionality.

A processor may be any conventional general purpose single- or multi-chip processor that can execute logic by means of various lines such as address lines, data lines, and control lines and registers and shift registers. Moreover, any logical blocks, modules, and circuits described herein can be implemented or performed, in addition to a general purpose processor, in or by a digital signal processor (DSP), a field programmable gate array (FPGA) or other programmable logic device such as an application specific integrated circuit (ASIC), discrete gate or transistor logic, discrete hardware components, or any combination thereof designed to perform the functions described herein. A processor can be implemented by a controller or state machine or a combination of computing devices.

Any software and/or applications described by way of flow charts and/or user interfaces herein can include various sub-routines, procedures, etc. It is to be understood that logic divulged as being executed by e.g. a module can be redistributed to other software modules and/or combined together in a single module and/or made available in a shareable library.

Logic when implemented in software, can be written in an appropriate language such as but not limited to C# or C++, and can be stored on or transmitted through a computer-readable storage medium (e.g. that may not be a carrier wave) such as a random access memory (RAM), read-only memory (ROM), electrically erasable programmable read-only memory (EEPROM), compact disk read-only memory (CD-ROM) or other optical disk storage such as digital versatile disc (DVD), magnetic disk storage or other magnetic storage devices including removable thumb drives, etc. A connection may establish a computer-readable medium. Such connections can include, as examples, hard-wired cables including fiber optics and coaxial wires and twisted pair wires. Such connections may include wireless communication connections including infrared and radio.

In an example, a processor can access information over its input lines from data storage, such as the computer readable storage medium, and/or the processor can access information wirelessly from an Internet server by activating a wireless transceiver to send and receive data. Data typically is converted from analog signals to digital by circuitry between the antenna and the registers of the processor when being received and from digital to analog when being transmitted. The processor then processes the data through its shift registers to output calculated data on output lines, for presentation of the calculated data on the device.

Components included in one embodiment can be used in other embodiments in any appropriate combination. For example, any of the various components described herein and/or depicted in the Figures may be combined, interchanged or excluded from other embodiments.

"A system having at least one of A, B, and C" (likewise "a system having at least one of A, B, or C" and "a system having at least one of A, B, C") includes systems that have A alone, B alone, C alone, A and B together, A and C together, B and C together, and/or A, B, and C together, etc.

"A system having one or more of A, B, and C" (likewise "a system having one or more of A, B, or C" and "a system having one or more of A, B, C") includes systems that have A alone, B alone, C alone, A and B together, A and C together, B and C together, and/or A, B, and C together, etc.

The term "circuit" or "circuitry" is used in the summary, description, and/or claims. As is well known in the art, the term "circuitry" includes all levels of available integration, e.g., from discrete logic circuits to the highest level of circuit integration such as VLSI, and includes programmable logic components programmed to perform the functions of an embodiment as well as general-purpose or special-purpose processors programmed with instructions to perform those functions.

Now specifically in reference to FIG. 1, it shows an example block diagram of an information handling system and/or computer system 100. Note that in some embodiments the system 100 may be a desktop computer system, such as one of the ThinkCentre® or ThinkPad® series of personal computers sold by Lenovo (US) Inc. of Morrisville, N.C., or a workstation computer, such as the ThinkStation®, which are sold by Lenovo (US) Inc. of Morrisville, N.C.; however, as apparent from the description herein, a client device, a server or other machine in accordance with present principles may include other features or only some of the features of the system 100. Also, the system 100 may be e.g. a game console such as XBOX® or Playstation®.

As shown in FIG. 1, the system 100 includes a so-called chipset 110. A chipset refers to a group of integrated circuits, or chips, that are designed to work together. Chipsets are usually marketed as a single product (e.g., consider chipsets marketed under the brands INTEL®, AMID®, etc.).

In the example of FIG. 1, the chipset 110 has a particular architecture, which may vary to some extent depending on brand or manufacturer. The architecture of the chipset 110 includes a core and memory control group 120 and an I/O controller hub 150 that exchange information (e.g., data, signals, commands, etc.) via, for example, a direct management interface or direct media interface (DMI) 142 or a link controller 144. In the example of FIG. 1, the DMI 142 is a chip-to-chip interface (sometimes referred to as being a link between a "northbridge" and a "southbridge").

The core and memory control group 120 include one or more processors 122 (e.g., single core or multi-core, etc.) and a memory controller hub 126 that exchange information via a front side bus (FSB) 124. As described herein, various components of the core and memory control group 120 may be integrated onto a single processor die, for example, to make a chip that supplants the conventional "northbridge" style architecture.

The memory controller hub 126 interfaces with memory 140. For example, the memory controller hub 126 may provide support for DDR SDRAM memory (e.g., DDR, DDR2, DDR3, etc.). In general, the memory 140 is a type of random-access memory (RAM). It is often referred to as "system memory."

The memory controller hub 126 further includes a low-voltage differential signaling interface (LVDS) 132. The LVDS 132 may be a so-called LVDS Display Interface (LDI) for support of a display device 192 (e.g., a CRT, a flat panel, a projector, a touch-enabled display, etc.). A block 138 includes some examples of technologies that may be supported via the LVDS interface 132 (e.g., serial digital video, HDMI/DVI, display port). The memory controller hub 126 also includes one or more PCI-express interfaces (PCI-E) 134, for example, for support of discrete graphics 136. Discrete graphics using a PCI-E interface has become an alternative approach to an accelerated graphics port (AGP). For example, the memory controller hub 126 may include a 16-lane (×16) PCI-E port for an external PCI-E-based graphics card (including e.g. one of more GPUs). An example system may include AGP or PCI-E for support of graphics.

The I/O hub controller 150 includes a variety of interfaces. The example of FIG. 1 includes a SATA interface 151, one or more PCI-E interfaces 152 (optionally one or more legacy PCI interfaces), one or more USB interfaces 153, a LAN interface 154 (more generally a network interface for communication over at least one network such as the Internet, a WAN, a LAN, etc. under direction of the processor(s) 122), a general purpose I/O interface (GPIO) 155, a low-pin count (LPC) interface 170, a power management interface 161, a clock generator interface 162, an audio interface 163 (e.g., for speakers 194 to output audio), a total cost of operation (TCO) interface 164, a system management bus interface (e.g., a multi-master serial computer bus interface) 165, and a serial peripheral flash memory/controller interface (SPI Flash) 166, which, in the example of FIG. 1, includes BIOS 168 and boot code 190. With respect to network connections, the I/O hub controller 150 may include integrated gigabit Ethernet controller lines multiplexed with a PCI-E interface port. Other network features may operate independent of a PCI-E interface.

The interfaces of the I/O hub controller 150 provide for communication with various devices, networks, etc. For example, the SATA interface 151 provides for reading, writing or reading and writing information on one or more drives 180 such as HDDs, SDDs or a combination thereof, but in any case the drives 180 are understood to be e.g. tangible computer readable storage mediums that may not be carrier waves. The I/O hub controller 150 may also include an advanced host controller interface (AHCI) to support one or more drives 180. The PCI-E interface 152 allows for wireless connections 182 to devices, networks, etc. The USB interface 153 provides for input devices 184 such as keyboards (KB), mice and various other devices (e.g., cameras, phones, storage, media players, etc.).

In the example of FIG. 1, the LPC interface 170 provides for use of one or more ASICs 171, a trusted platform module (TPM) 172, a super I/O 173, a firmware hub 174, BIOS support 175 as well as various types of memory 176 such as ROM 177, Flash 178, and non-volatile RAM (NVRAM) 179. With respect to the TPM 172, this module may be in the form of a chip that can be used to authenticate software and hardware devices. For example, a TPM may be capable of performing platform authentication and may be used to verify that a system seeking access is the expected system.

The system 100, upon power on, may be configured to execute boot code 190 for the BIOS 168, as stored within the SPI Flash 166, and thereafter processes data under the control of one or more operating systems and application software (e.g., stored in system memory 140). An operating system may be stored in any of a variety of locations and accessed, for example, according to instructions of the BIOS 168.

In addition to the foregoing, the system 100 includes a vibrating element 191 that may be and/or include e.g. a motor for moving an eccentric weight of the vibrating element to generate a vibration at the system 100. Also shown is an audio receiver/microphone 195 in communication with the processor 122 and configured to provide input thereto based on e.g. a user providing audible input to the microphone 195. A camera 196 is also shown, which is in communication with and provides input to the processor 122. The camera 196 may be, e.g., a thermal imaging camera, a digital camera such as a webcam, and/or a camera integrated into the system 100 and controllable by the processor 122 to gather pictures/images and/or video.

Still further, a GPS transceiver 199 is shown that is configured to e.g. receive geographic position information from at least one satellite and provide the information to the processor 122. However, it is to be understood that another suitable position receiver other than a GPS receiver may be used in accordance with present principles to e.g. determine the location of the system 100.

Figure 2:
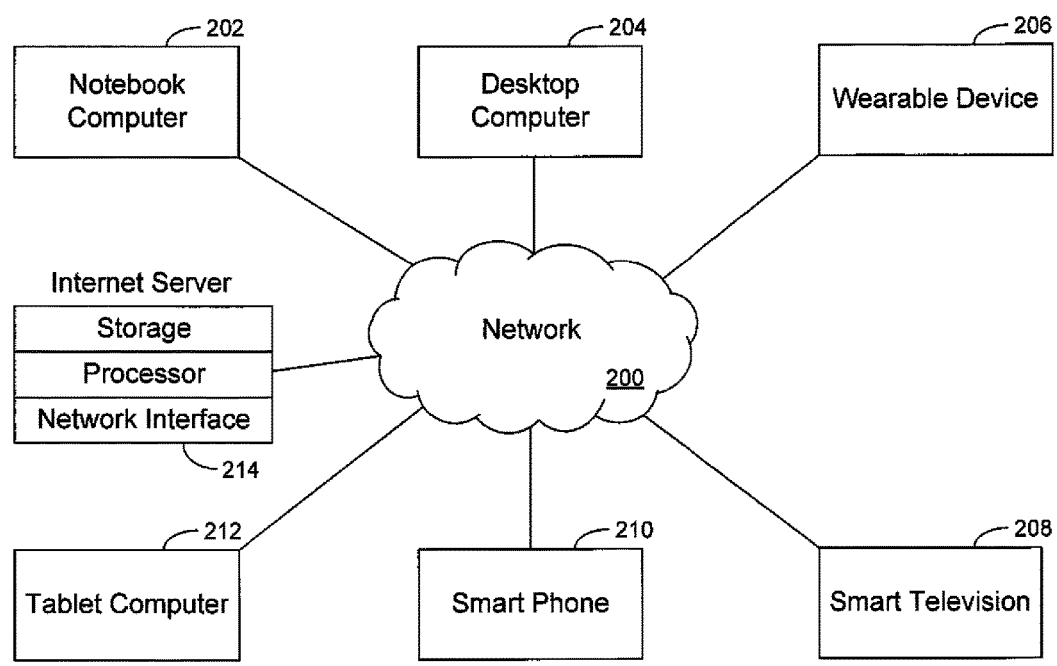
FIG. 2 is a block diagram of a network of devices in accordance with present principles.

Additionally, though now shown for clarity, in some embodiments the system 100 may include a gyroscope for e.g. sensing and/or measuring the orientation of the system 100 and an accelerometer for e.g. sensing acceleration and/or movement of the system 100, Before moving on to FIG. 2, it is to be understood that an example client device or other machine/computer may include fewer or more features than shown on the system 100 of FIG. 1. In any case, it is to be understood at least based on the foregoing that the system 100 is configured to undertake present principles.

Turning now to FIG. 2, it shows example devices communicating over a network 200 such as e.g. the Internet in accordance with present principles. It is to be understood that e.g. each of the devices described in reference to FIG. 2 may include at least some of the features, components, and/or elements of the system 100 described above. In any case, FIG. 2 shows a notebook computer 202, a desktop computer 204, a wearable device 206 such as e.g. a smart watch, a smart television (TV) 208, a smart phone 210, a tablet computer 212, and a server 214 in accordance with present principles such as e.g. an Internet server that may e.g. provide cloud storage accessible to the devices 202-212. It is to be understood that the devices 202-214 are configured to communicate with each other over the network 200 to undertake present principles.

Figure 3:
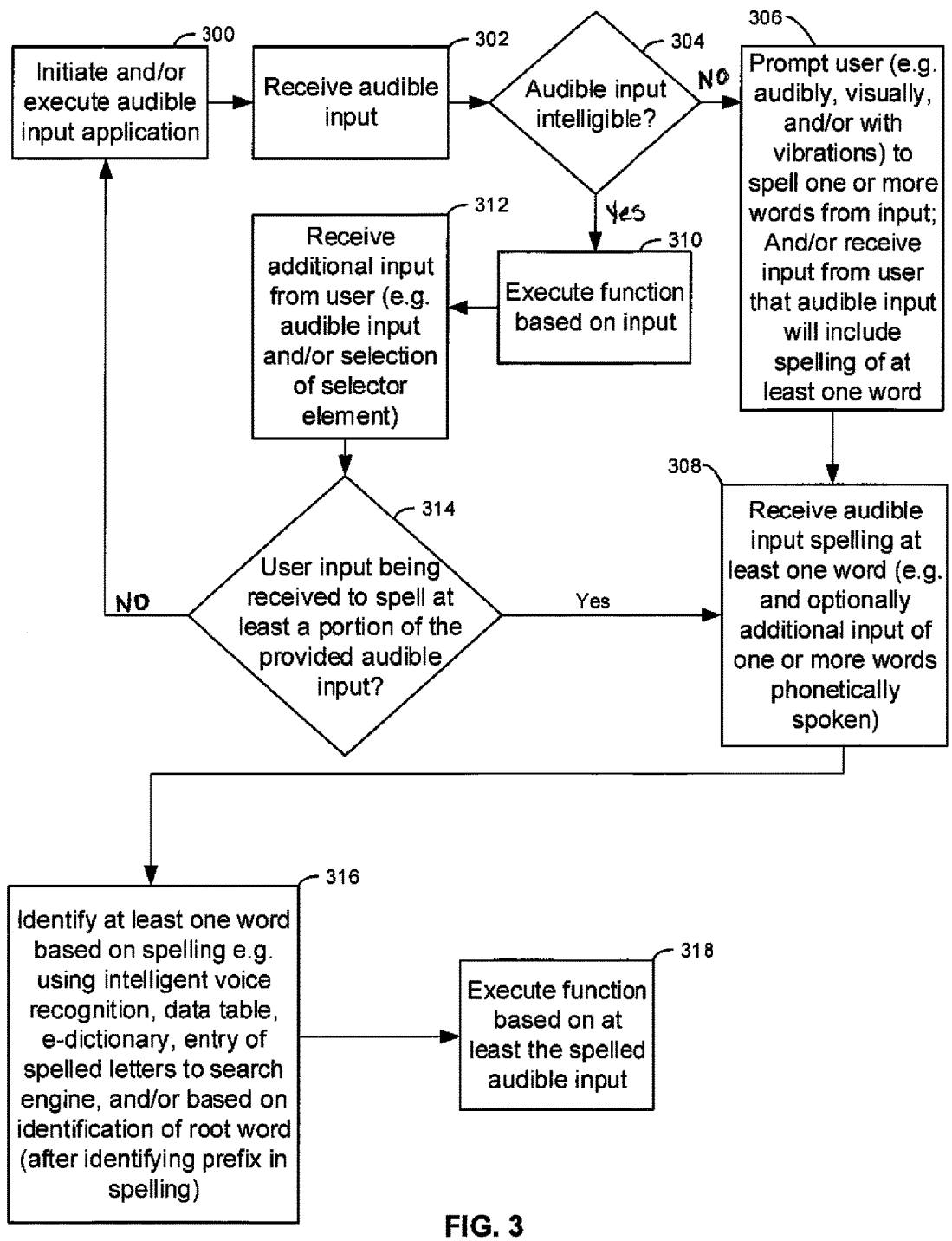
FIGS. 3 and 4 are flow charts showing example algorithms in accordance with present principles.

Referring to FIG. 3, it shows example logic that may be undertaken by a device (referred to below as the "present device") such as the system 100 in accordance with present principles. Beginning at block 300, the logic initiates and/or executes an audible input application for undertaking present principles (e.g. a personal assistant application), and then proceeds to block 302 where the logic receives audible input from a user such as e.g. a request for information, a command to perform a function at the present device (e.g. to send a text message to another device), etc. From block 302 the logic moves to decision diamond 304 where the logic determines whether the audible input received at block 302 is intelligible to the present device.

A negative determination at diamond 304 causes the logic to proceed to block 306, where the logic may provide a prompt to spell one or more words and/or phrases from the input that was provided at block 302. The prompt may be audible (e.g. an automated voice emanating from a speaker of the present device requesting "Please spell that last word"), may be visual (e.g. such as providing a prompt on a touch-enabled display of the present device), and/or may be one or more vibrations from the present device e.g. based on the present device actuating a vibrating element such as the element 191 discussed above. The vibration may be constant for a predetermined and/or user-defined amount of time, may be plural periodic vibrations of equal lengths of time separated by periods of no vibration, where the periods of no vibration are also of the same length of time as each other, may be a predefined and/or user-defined pattern to connote that input should be spelled, etc. In any case, but still in reference to block 306, it is to be understood that in addition to or in lieu of the logic providing a prompt as discussed above, the logic may receive input from a user that audible input will be provided that will include the spelling of at least one word.

Thus, from block 306, the logic proceeds to block 308 where the logic receives audible input spelling at least one word, and optionally also at block 308 the logic may receive other audible input of words being (e.g. phonetically) spoken. E.g., the input received at block 308 may be (it being understood that the following letters separated by hyphens represent input that is spelled and that words below without hyphens represent audible input of words that are phonetically spoken rather than spelled), "Please find information on i-s-l-e-o-f-v-i-e-w."

Note further that the present device may be configured to recognize certain words as not pertaining to the subject, context, and/or topic of the audible input itself but rather pertaining to how one or more words are being spelled. E.g., based on context-awareness software, the present device may be configured to recognize, e.g. when currently receiving a portion of audible input that is being spelled, that the word "space" is meant to not be a portion of information being requested but rather to connote that the spelled input being provided is for plural words separated by a space. Thus, taking the example above again, the audible input may be "Please find information on i-s-l-e space o-f space v-i-e-w," which will be recognized by the present device as "Please find information on Isle of View." Similar to the word "space," the phrase "next word" may be used, mutatis mutandis.

Still in reference to FIG. 3, from block 308 the logic proceeds to block 316, which will be described shortly. However, reference is first made back to decision diamond 304. If an affirmative rather than negative determination is made thereat, rather than proceeding to block 306 the logic instead moves to block 310, at which the logic executes a function based on the input that was received at block 302. The logic then proceeds to block 312 where the logic may receive additional input from a user, such as e.g. audible input (e.g. "That was not correct. I'm going to spell the last two words that were provided." As other examples, "I'm going to spell the last word," or "I'm going to spell that phrase.") and/or selection of a selector element that at least a portion of the input provided at block 302 will be spelled. The user may provide such input e.g. when the present device has received input that is intelligible to it and has thus executed a function according to the input, but where the present device misunderstood, misidentified, mischaracterized, etc. the audible input that was received at block 302. Taking the Isle of View example again, the audible input provided by a user may have been "Please find information on Isle of View" but as received at block 302 the logic may have determined the input to be "Please find information on I love you" since, e.g. phonetically, the two may sound at least somewhat similar and thus raising the likelihood that the present device erroneously determines the input being provided audibly.

Regardless, from block 312 the logic proceeds to decision diamond 314 where the logic determines whether user input is being received (e.g. subsequent to receiving the input at block 312). An affirmative determination causes the logic to move to block 308 and proceed therefrom (e.g. to begin and/or continue receiving audible input including the spelling of at least one word in response to receipt of the input received at block 312), while a negative determination at diamond 314 causes the logic to revert back to block 300 and proceed therefrom. Note that in some embodiments a negative determination at diamond 314 may cause the logic to determine that a different and/or separate sequence of audible input is being or will be provided e.g. to thus issue a command to the present device to undertake another function (e.g. one not related to the Isle of View, using the example above), and may thus proceed from block 300 again after diamond 314 based on such a determination.

Furthermore, note that a negative determination may be made at diamond 314 responsive to e.g. no audible input, spelled words or phonetically spoken words or otherwise, being received within a threshold time (e.g. predefined and/or user defined) from receipt of the input at block 312. A similar threshold time e.g. for reverting back to block 300 and/or for determining that input that may follow will pertain to a different and/or separate sequence than was received at block 302 may occur at block 308 as well when the logic proceeds thereto from block 306 and does not receive audible input thereat, mutatis mutandis.

Still in reference to FIG. 3, from block 308 regardless of how the logic arrived thereat, the logic proceeds to block 316 where the logic identifies and/or determines at least one word based on the received audible input that was spelled. The logic may make such an identification at diamond 316 e.g. using intelligent voice recognition (IVR), based on a comparison of the spelled input to data in a data table (e.g. such as the table 700 to be described below), based on a comparison of the spelled input to data in an electronic dictionary accessible to the present device, based on entry of the spelled input to a (e.g. Internet) search engine (e.g. when the spelled input received comprises a portion of a word but not an entire word, and hence a search engine's auto-compete feature may be used to identify the word), and/or based on identification of a root word from the spelled input (as will be discussed further below in reference to FIG. 4). Furthermore, note that the logic at block 316 may instead or additionally assemble the spelled input into one or more words (e.g. based on "space" audible input (or the lack thereof) from a user indicating that spelled input being provided are for plural words to be separated by a space as discussed herein) and undertake a function as it would had the input been audibly phonetically provided. Concluding the description of FIG. 3, from block 316 the logic moves to block 318 where the logic executes a function based at least partially on the spelled input that was identified and/or determined. Such a function may be e.g. presentation of a user interface for composing an email based on a command to compose an email to a particular recipient, a determination and/or location of information based on a request contained in the audible input, the setting of an alarm based on a command to set the alarm, a determination and/or location of traffic information based on a request for traffic information, etc.

Figure 4:
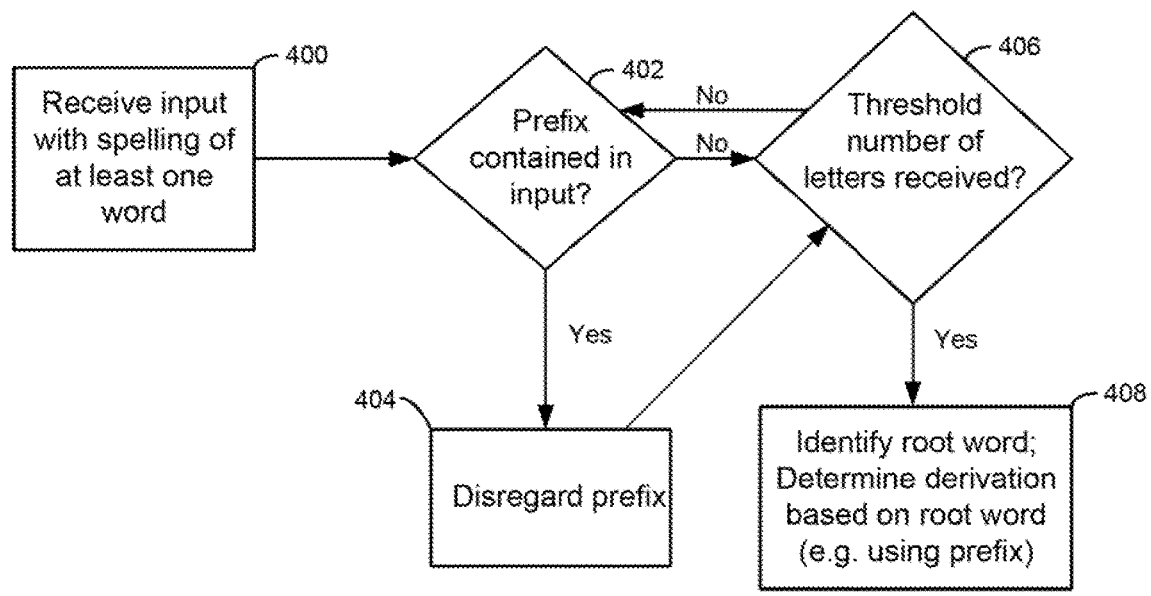

Continuing the detailed description in reference to FIG. 4, it shows example logic that may be undertaken by a device such as the system 100 in accordance with present principles. Beginning at block 400, the logic receives input including the spelling of at least one word in accordance with present principles. The logic then proceeds to decision diamond 402, where the logic determines whether a prefix forms part of the spelled input received at block 400. The determination at diamond 402 may be made based on e.g. a comparison of a predetermined and/or threshold number of characters of spelled input (e.g., three) to data in a data table of prefixes to determine if the spelled input contains a prefix. In any case, a negative determination at diamond 402 causes the logic to proceed to decision diamond 406, while an affirmative determination at diamond 402 instead causes the logic to first move to block 404 where the logic disregards the spelled input containing the prefix for the purpose of identifying at least one root word based on the spelled input, and from block 404 moves to decision diamond 406.

Regardless, once at diamond 406 the logic may in some embodiments determine whether a threshold number of letters and/or characters has been received in the spelled input, and thus responsive to an affirmative determination at diamond 406 identify at least one root word at block 408. However, still describing diamond 406, the threshold number may be predefined and/or user defined. Furthermore, note that in some embodiments the logic may identify a root word in accordance with present principles e.g. without making the determination at diamond 406 but instead proceeding directly from e.g. block 400, diamond 402, or block 404. Regardless, before describing block 408 in more detail, it is to be understood that a negative determination at diamond 406 may instead cause the logic to revert back to diamond 402 and proceed therefrom.

Now in reference to block 408, the logic may identify a root word in accordance with present principles (e.g. similar to one or more of the ways disclosed in reference to block 316 that a word may be identified) e.g. while excluding the prefix disregarded at block 404. Also at block 408, the logic determines a derivation of the root word based on the root word e.g. using the prefix that was identified and/or using other spelled audible input that the logic has received such as e.g. letters comprising and/or identified as a suffix.

Figure 5:
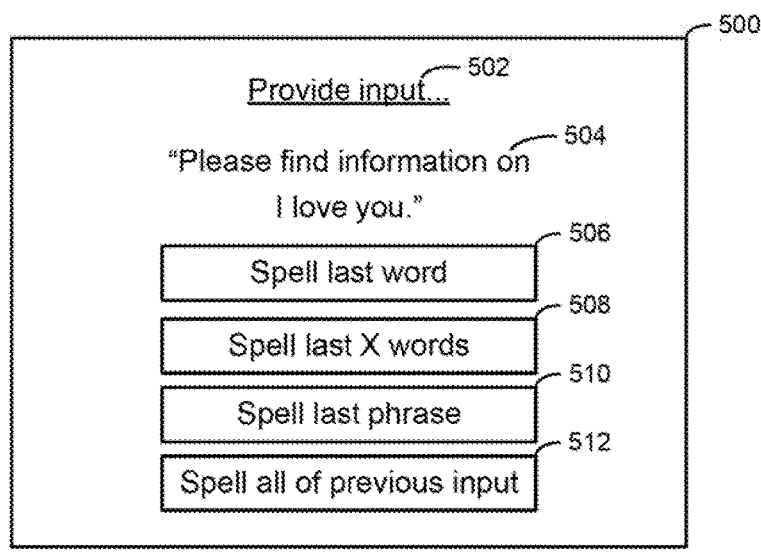
FIGS. 5 and 6 are example user interfaces (UI) in accordance with present principles.

Now in reference to FIG. 5, a user interface (UI) 500 is shown that may be presented on a device such as the system 100, may be presented as part of an audible input application for receiving audible input, may be presented in response to a determination that previously provided audible input is illogical in context based on the audible input provided, etc. In any case, the UI 500 includes a prompt 502 for the user to provide audible input, along with an indication 504 of previously received audible input. As may be appreciated from the indication 504, the request for information on Isle of View is again being used as an example, but with the device (e.g. albeit incorrectly from the user's perspective) determining that the input was a request for information on "I love you." Thus, one or more selector elements may be presented on the UI 500, each of which is understood to be selectable to automatically without further user input configure the device to wait and/or ready itself to receive spelled audible input pertaining to the portion of audible input associated with the particular selector element that is selected.

Thus, a first selector element 506 is shown that is selectable to provide input to the device that only the last word that was provided will be spelled (e.g., in this example, the word "you"). A second selector element 508 is shown that is selectable to provide input to the device that a last threshold number of words that were provided will be spelled (e.g. the threshold number being predefined and/or user defined, and/or varying in any particular instance based on a determination by the device of a number of words that have been identified as being out of context (and/or illogical) with the rest of the audible input (and hence the selector element 508 may indicate that number on the element 508 rather than the "X" variable shown)). Yet another selector element 510 is shown that is selectable to provide input to the device that a last phrase that was provided will be spelled (e.g., the phrase's beginning and end being identified based on a determination and/or identification by the device of e.g. subject and predicate of a sentence, sentence clauses, portions of audible input that if written would be separated by a comma or other punctuation, and/or based on the context of the audible input and/or portions thereof being determined to be illogical (and hence the selector element 510 may in some embodiments indicate the phrase itself that was identified as being out of context)). Still further, in some embodiments the UI 500 may include a selector element 512 that is selectable to provide input to the device that all of the previous input (e.g. and/or all of the input represented by the indication 504) will be spelled in audible input to the device.

Figures 6, 7:
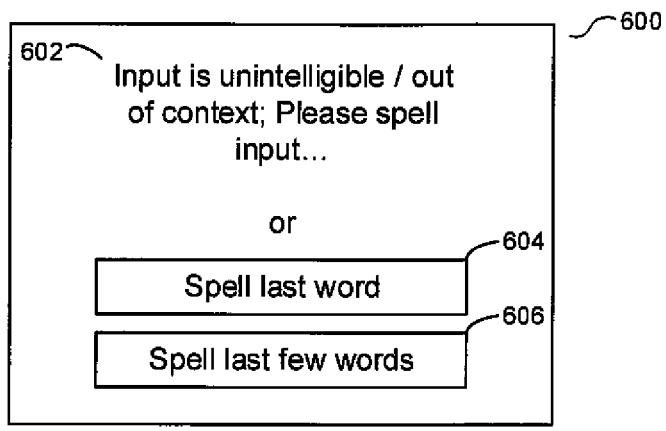
FIG. 7 is an example data table in accordance with present principles.

Before moving on to the description of FIG. 6, it is to be understood that the selector elements 506-512 may pertain not to e.g. the last word or words provided, but in some instances other words provided in audible input other than the last word or words (e.g. responsive to a determination that it was e.g. a middle portion of audible input that was illogical and/or out of context).

Now in reference to FIG. 6, a UI 600 is shown that may be presented on a device such as the system 100, may be presented as part of an audible input application for receiving audible input, may be presented in response to a determination that previously provided audible input is unintelligible, etc. As shown in FIG. 6, the UI 600 includes a prompt 602 that audible input that has been received at the device is unintelligible to the device and requesting that a user spell e.g. at least the unintelligible portion of the input. Thus, though not shown, in some instances the prompt 602 may contain a representation as best as possible of the input that was received that was unintelligible even if e.g. not including a real word and/or a correct spelling.

Also, note that in some embodiments that the UI 600 may include one or more selector elements selectable to provide input to the device regarding the portion of the audible input that will be provided again as spelled input. Thus, each of the selector elements presented on the UI 600 is understood to be selectable to automatically without further user input configure the device to wait and/or ready itself to receive spelled audible input pertaining to the portion of audible input associated with the particular selector element that is selected. Accordingly, a first selector element 604 is shown that is selectable to provide input to the device that only the last word that was provided will be spelled. A second selector element 606 is shown that is selectable to provide input to the device that a last threshold number of words will be spelled. Although not shown, still other selector elements may be presented on the UT 600 for selection therefrom, such as e.g. selector elements substantially similar to the elements 510 and 512 described above, it also being understood that the prompt 602 and/or elements on the UI 600 need not pertain to a last portion of audible input received as in the example shown but may pertain to another portion of the audible input that was received.

Continuing the detailed description in reference to FIG. 7, it shows an example data table 700 that may be used in accordance with present principles (e.g. to identify a word that has been spelled in audible input). The table 700 includes a first column 702 of words (e.g. in alphabetical order as shown) and a second column 704 of one or more meanings for each word on the same row. Thus, it is to be understood that in some embodiments the table 700 may form part of an electronic dictionary. However, note that the table 700 need not necessarily include the column 704 to identify a word in accordance with present principles.

Regardless, but again taking the "Isle of View" example discussed above, it is to be understood that FIG. 7 shows a portion of the table 700 including words alphabetically close to and/or including the word "isle." A device undertaking the logic discussed above may thus receive an audible spelling of "i-s-l-e," access the table 700, and compare letters identified in the audible spelling of "i-s-l-e" to the entries in column 702 until a match of the identified letters with an entry in column 702 is made to thus identify the word being spelled.

Without reference to any particular figure, it is to be understood that present principles may be used in automated (e.g. call-in) phone systems as well. Furthermore, it is to be understood that in addition to intelligent voice recognition being used as described above, interactive voice response and/or natural language understanding software and/or principles may also be used in accordance with present principles.

Also without reference to any particular figure, it is to be understood that as described herein, search engines may be used e.g. to identify a word. However, it is to be understood that search engines may be used in accordance with present principles for still other reasons, such as e.g. determining the context of audible input. E.g., the phrase "Isle of View" may be otherwise determined to be illogical and/or out of context by a device undertaking present principles but upon entering the phrase to a search engine may determine that the phrase pertains to an album by the band the Pretenders, which may accordingly be used as information when determining a function to execute based on the audible input (e.g. providing information on the Isle of View album by the Pretenders and/or information on the individual band members themselves).

Also without reference to any particular figure, it is to be understood that when receiving spelled audible input at a device in accordance with present principles, e.g., the device may track the time between letters being spelled and e.g. responsive to a threshold time expiring between receipt of two letters determine that the second of the two letters and/or a letter to follow pertains to a separate word than the first of the two letters. Such a threshold time may be predefined and/or user defined.

Furthermore, present principles recognize that e.g. a device may e.g. reject audible input of words being phonetically spoken e.g. a threshold number of times (e.g. the threshold being predefined and/or defined by a user) before providing a prompt and/or request that what was contained in the input be spelled in response to the threshold number of times being reached.

Before concluding, it is to be understood that although e.g. a software application for undertaking present principles may be vended with a device such as the system 100, present principles apply in instances where such an application is e.g. downloaded from a server to a device over a network such as the Internet. Furthermore, present principles apply in instances where e.g. such an application is included on a computer readable storage medium that is being vended and/or provided, where the computer readable storage medium is not a carrier wave and/or another signal per se.

While the particular RECEIVING AT A DEVICE AUDIBLE INPUT THAT IS SPELLED is herein shown and described in detail, it is to be understood that the subject matter which is encompassed by the present application is limited only by the claims.

What is claimed is:

1. A device, comprising:
at least one processor;

a touch-enabled display accessible to the at least one processor; and storage accessible to the at least one processor and bearing instructions executable by the at least one processor to:

present a user interface (UI) on the touch-enabled display, the UI comprising a first selector element that is selectable to provide first input to the device, wherein the first input indicates that second input will be provided that comprises the spelling of only a single word, the UI comprising a second selector element that is selectable to provide third input to the device, wherein the third input indicates that fourth input will be provided that comprises the spelling of plural words rather than a single word;

receive the first input based on selection of the first selector element;

receive the second input, the second input being audible input comprising the spelling by a user of a single word; and responsive to receipt of the second input, identify the single word and execute a function using the single word.

2. The device of claim 1, wherein the instructions are included as part of an audible input application stored on the device, the audible input application being to execute functions based on commands that are received at the device.

3. The device of claim 1, wherein the function is associated with a command at least partially included in the second input.

4. The device of claim 1, wherein the single word is identified at least in part based on a comparison of at least one letter identified from the second input to data that is accessible to the at least one processor.

5. The device of claim 1, wherein the device identifies spelled words at least in part based on entry to an Internet search engine of at least one letter that is identified as spelled.

6. The device of claim 1, wherein the function is executed based on executing intelligent voice recognition (IVR) on the second input.

7. A method, comprising:

presenting a user interface (UI) on a display, the UI comprising a first selector element that is selectable to provide first input to a device, wherein the first input indicates that second input will be provided that comprises the spelling of only a single word, the UI comprising a second selector element that is selectable to provide third input to the device, wherein the third input indicates that fourth input will be provided that comprises the spelling of plural words rather than a single word;

receiving, from a user and at the device, the third input based on selection of the second selector element;

receiving, from the user and at the device, the fourth input that comprises the spelling of plural words;

processing, at the device, the fourth input to identify plural words that are spelled via the fourth input; and executing, using the device, a function based on the plural words.

8. An apparatus comprising:
a first processor;
a network adapter;
storage bearing instructions executable by a second processor of a device for:
presenting a user interface (UI) on a display accessible to the device, the UI comprising a first selector element that is selectable to provide first input to the device, wherein the first input indicates that second input will comprise the spelling by a user of only a single word, the UI comprising a second selector element that is selectable to provide third input to the device, wherein the third input indicates that fourth input will comprise the spelling of plural words rather than a single word;

receiving the first input based on selection of the first selector element;

receiving the second input, the second input comprising audible input that comprises the spelling by the user of a single word;

identifying, based on the second input, the single word that is spelled by the user via the second input; and executing, based on the identifying of the single word, a function at the device;

wherein the first processor transfers the instructions to the device over a network via the network adapter.

9. The method of claim 7, wherein the fourth input further comprises audible input of at least one word phonetically spoken.

10. The device of claim 1, wherein the instructions are executable by the at least one processor to:
based on receipt of the first input, wait to receive the second input; and
while waiting to receive the second input, receive the second input.

11. The device of claim 10, wherein the instructions are executable by the at least one processor to identify the single word based on:
comparing at least one letter identified from the second input to data that is accessible to the device to identify a word from the data that corresponds to the at least one letter identified from the second input.

12. The device of claim 1, wherein the instructions are executable by the at least one processor to:
receive, from the user, fifth input that indicates that sixth input will be provided that comprises the spelling of at least one word, the fifth input being audible input;
receive the sixth input, the sixth input being audible input comprising the spelling by the user of at least a first word; and
responsive to receipt of the sixth input, identify the first word and execute a function using the first word.

13. The device of claim 1, wherein the instructions are executable by the at least one processor to:
responsive to rejection of voice input a threshold number of times, present the UI on the touch-enabled display.

14. The method of claim 7, comprising:
waiting, based on receipt of the third input, to receive the fourth input; and
receiving, while waiting to receive the fourth input, the fourth input.

15. The method of claim 7, wherein identifying the plural words comprises:
comparing at least one letter identified from the fourth input to data that is accessible to the device to identify plural words from the data that correspond to letters identified from the fourth input.

16. The apparatus of claim 8, wherein the instructions are executable for:
waiting, based on receipt of the first input, to receive the second input; and
receiving, while waiting for the second input, the second input.

17. The apparatus of claim 8, wherein the instructions are executable for identifying at least one word that is spelled by:
  comparing at least one letter identified from the second input to data that is accessible to the device to identify a word from the data that corresponds to the at least one letter identified from the second input.

18. The apparatus of claim 8, wherein the instructions are executable for:
  presenting, responsive to rejection of third input a threshold number of times, the UI on the display, wherein the third input is audible input.

19. The device of claim 1, comprising a vibration element, wherein the instructions are executable by the at least one processor to:
  request that the user spell at least one word by actuating the vibration element to generate a vibration at the device.

20. The method of claim 7, comprising:
  requesting that audible input to the device be spelled by actuating a vibration element on the device to generate a vibration at the device.

\* \* \* \* \*